(12) United States Patent
Huang (10) Patent No.: US 10,008,926 B2
(45) Date of Patent: Jun. 26, 2018

(54) SWITCHED CAPACITOR DC-DC POWER CONVERTER CIRCUIT AND VOLTAGE OUTPUT METHOD USING THE SAME

(71) Applicant: NUVOTON TECHNOLOGY CORPORATION, Hsinchu (TW)

(72) Inventor: Po-Hsuan Huang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days. days.

(21) Appl. No.: 15/728,748

(22) Filed: Oct. 10, 2017

(65) Prior Publication Data

US 2018/0102705 A1 Apr. 12, 2018

(30) Foreign Application Priority Data

Oct. 7, 2016 (TW) .............................. 105132619 A (51) Int. Cl.
*H02M 3/07* (2006.01)

(52) U.S. Cl.
CPC .................................... *H02M 3/07* (2013.01)

(58) Field of Classification Search
None
See application file for complete search history.

(56) References Cited

U.S. PATENT DOCUMENTS

| | | | |
|---|---|---|---|
| 2004/0135621 A1* | 7/2004 | Sumita | G05F 3/205 327/534 |
| 2010/0156501 A1* | 6/2010 | Stellberger | G06G 7/186 327/336 |
| 2013/0033242 A1* | 2/2013 | Gunther | G05F 1/56 323/268 |

* cited by examiner

*Primary Examiner* — Adolf Berhane
*Assistant Examiner* — Henry Lee, III
(74) *Attorney, Agent, or Firm* — Muncy, Geissler, Olds & Lowe, P.C.

(57) ABSTRACT

A switched capacitor DC-DC converter circuit and a method for outputting voltage using the same are disclosed. The circuit includes a switched capacitor circuit and a body bias control circuit. The on-resistance of the transistor in the switched capacitor circuit is increased by the body bias control circuit, so as to lower the voltage ripple generated from the output voltage.

10 Claims, 6 Drawing Sheets

SWITCHED CAPACITOR DC-DC POWER CONVERTER CIRCUIT AND VOLTAGE OUTPUT METHOD USING THE SAME

CROSS-REFERENCE TO RELATED APPLICATION

This application claims priority to Taiwan Patent Application No. 105132619, filed on Oct. 7, 2016, in the Taiwan Intellectual Property Office, the disclosure of which is incorporated herein in its entirety by reference.

BACKGROUND OF THE INVENTION

1. Field of the Invention

The present disclosure relates to a switched-capacitor DC-DC power converter circuit and a voltage output method using the same. More particularly, the present disclosure relates to a switched capacitor DC-DC power converter circuit with base bias control function, and a voltage output method using the same.

2. Description of the Related Art

In recent years, requirement for system on chip is increasing rapidly, so in market there are various dedicated regulators for supplying different voltages. Among these voltage regulators, an inductive DC-DC converter has superior performance and efficiency. However, an inductor is required for implementation of the inductive DC-DC convertor, but it may increase cost and chip size. For this reason, a capacitive DC-DC convertor attracts more attention and is in rapid development.

The switched capacitor DC-DC convertor includes a plurality of switches and at least one capacitor, and during operation, the at least one capacitor is frequently charged and discharged. As a result, values of on-resistances of the switches may affect energy stored in the capacitor, and lower on-resistance may effectively reduce the energy loss during transmission; on the other hand, overly large current may damage the circuit or cause larger ripple of the output voltage. In conventional solution, the switched capacitor DC-DC convertor is provided with an additional or a adjustable resistor for adjustment of input current, but it also add chip area and cost.

SUMMARY OF THE INVENTION

In order to solve above-mentioned problem, the present disclosure is to provide a switched-capacitor DC-DC power converter circuit and a voltage output method using the same.

According to an embodiment, a switched-capacitor DC-DC power converter circuit including a switched-capacitor circuit and a base bias control circuit. The switched-capacitor circuit is disposed between a power input terminal and a power output terminal, and includes a plurality of first switches, a plurality of second switches and at least one capacitor. In a first stage of the switched-capacitor circuit, the plurality of first switches are turned on and the plurality of second switches are turned off, and a first current path is formed between the power input terminal and the power output terminal through the plurality of first switches and the at least one capacitor. In a second stage of the switched-capacitor circuit, the plurality of second switches are turned on and the plurality of first switches are turned off, and a second current path connected with the power output terminal is formed by the plurality of second switches and the at least one capacitor, and each of the plurality of first switches and second switches comprises a transistor. The base bias control circuit is coupled to at least one base of the transistors of the plurality of first switches and the plurality of second switches, and configured to receive an output voltage at the power output terminal and compare the output voltage with a reference voltage. When the output voltage is higher than the reference voltage, the base bias control circuit outputs a first voltage to the at least one base of the transistors, and when the output voltage is not higher than the reference voltage, the base bias control circuit outputs a second voltage, which is lower than the second voltage, to the at least one base of the transistors.

Preferably, the base bias control circuit includes: a first current source comprising a first current output terminal and a first current input terminal, and the first current output terminal coupled to the at least one base of the transistors, wherein a preset voltage is applied on the first current input terminal; a second current source comprising a second current input terminal; a comparator comprising a first input terminal coupled to the power output terminal and configured to receive an output voltage at the power output terminal, a second output terminal configured to receive the reference voltage, and a signal output terminal, wherein the comparator compares the output voltage and the reference voltage, and then output a control signal according to a comparison result; and a third switch comprising a first terminal coupled to the first current input terminal of the first current source, a second terminal coupled to the second current input terminal of the second current source, and a control terminal coupled to the signal output terminal of the comparator. When the output voltage is higher than the reference voltage, the third switch is turned off by the control signal, so that the at least one base of the transistors receives the first voltage, and when the output voltage is not high than the reference voltage, the third switch is turned on by the control signal, so that the at least one base of the transistors receives the second voltage.

Preferably, the base bias control circuit includes a fourth switch which having a terminal coupled to the at least one base of the transistors, other terminal coupled to ground, and a control terminal receiving an external control signal.

Preferably, switched-capacitor DC-DC power converter circuit further includes a plurality of diodes connected in series and disposed between the first current input terminal of the first current source and the at least one base of the transistors.

Preferably, the comparator is coupled to an oscillator and the comparator receives a clock signal generated by the oscillator, and the comparator is operated based on the clock signal to compare the output voltage with the reference voltage.

According to an embodiment, the present disclosure provides a voltage output method using a switched capacitor DC-DC power converter circuit, and the voltage output method includes following steps: providing a switched-capacitor circuit, which comprises a plurality of first switches, a plurality of second switches and at least one capacitor, disposed between a power input terminal and a power output terminal; operating the switched-capacitor circuit to switch between a first stage and a second stage, and in the first stage turning on the plurality of first switches and turning off the plurality of second switches, so as to form a first current path between the power input terminal and the power output terminal through the plurality of first switches and the at least one capacitor, and in the second stage, turning on the plurality of second switches and turning off the plurality of first switches, so as to form a second current path coupled to the power output terminal through the plurality of second switches and the at least one capacitor; providing a base bias control circuit coupled to at least one base of transistors of the plurality of first switches and the plurality of second switches, wherein the base bias control circuit receives an output voltage at the power output terminal; and comparing the output voltage with a reference voltage, wherein when the output voltage is higher than the reference voltage, the base bias control circuit outputs a first voltage to the at least one base of the transistors, and when the output voltage is not higher than the reference voltage, the base bias control circuit outputs a second voltage, which is lower than the first voltage, to the at least one base of the transistors.

Preferably, the base bias control circuit includes: a first current source comprising a first current output terminal and a first current input terminal, and the first current output terminal coupled to the at least one base of the transistors, wherein a preset voltage is applied on the first current input terminal; a second current source comprising a second current input terminal; a comparator comprising a first input terminal coupled to the power output terminal and configured to receive an output voltage at the power output terminal, a second output terminal configured to receive the reference voltage, and a signal output terminal, wherein the comparator compares the output voltage and the reference voltage, and then output a control signal according to a comparison result; and a third switch comprising a first terminal coupled to the first current input terminal of the first current source, a second terminal coupled to the second current input terminal of the second current source, and a control terminal coupled to the signal output terminal of the comparator. When the output voltage is higher than the reference voltage, the third switch is turned off by the control signal, so that the at least one base of the transistors receives the first voltage. When the output voltage is not high than the reference voltage, the third switch is turned on by the control signal, so that the at least one base of the transistors receives the second voltage.

Preferably, the voltage output method further includes a step of: disposing a fourth switch which comprises a terminal coupled to the at least one base of the transistors, other terminal coupled to ground, and a control terminal receiving an external control signal.

Preferably, the voltage output method further includes a step of: providing a plurality of diodes connected in series to clamp a preset voltage applied on the first current input terminal of the first current source under a condition that the output voltage is not higher than the reference voltage and the third switch is turned on.

Preferably, the comparator is coupled to an oscillator, and the comparator receives a clock signal generated by the oscillator, and the comparator is operated based on the clock signal to compare the output voltage with the reference voltage.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE PREFERRED EMBODIMENTS

The following embodiments of the present disclosure are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

Figure 1:
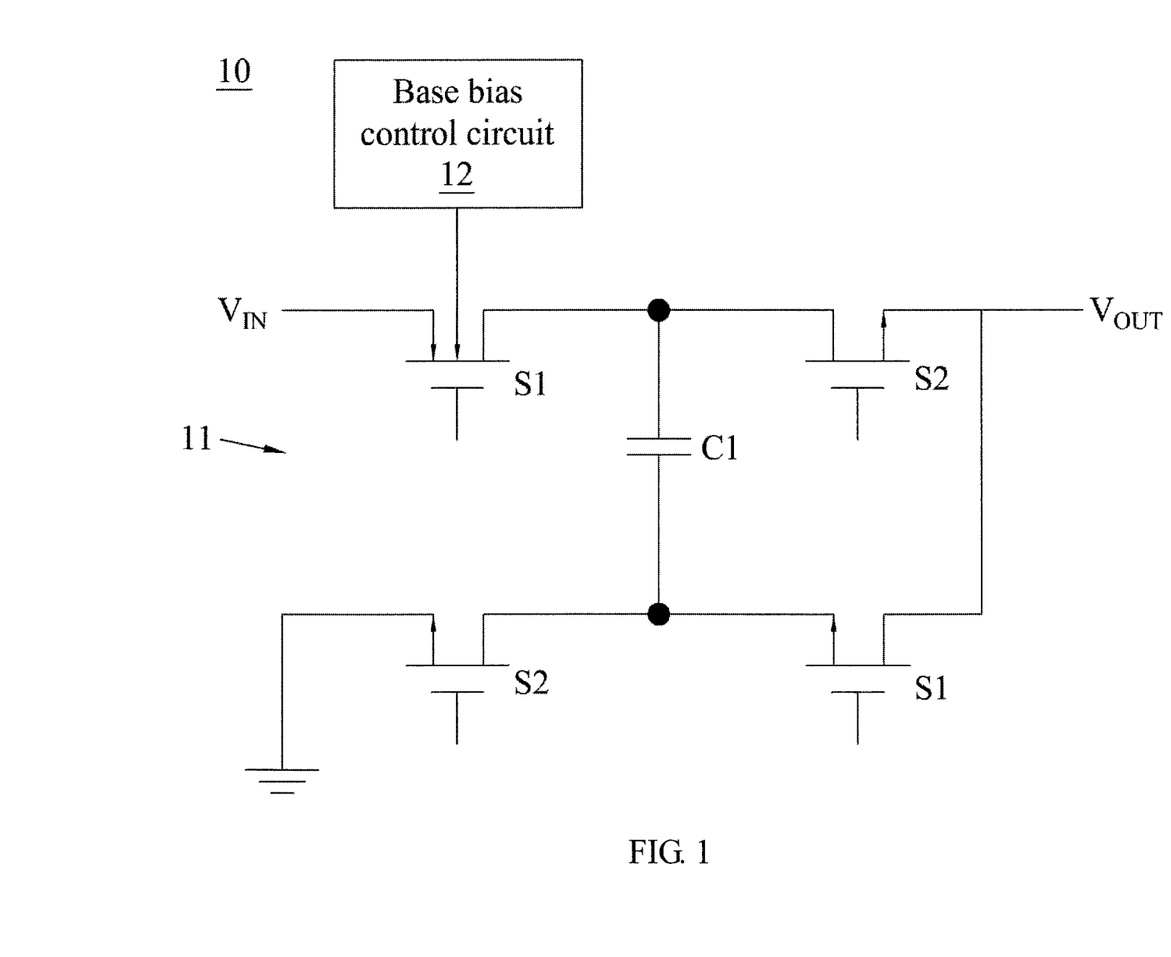
FIG. 1 is a schematic view of a switched-capacitor DC-DC power converter circuit of the present disclosure.

The following refers to FIG. 1, which is a schematic view of a switched-capacitor DC-DC power converter circuit of the present disclosure. As shown in FIG. 1, a switched-capacitor DC-DC power converter circuit 10 includes a switched-capacitor circuit 11 and a base bias control circuit 12. The switched-capacitor circuit 11 is disposed between a supply input terminal VIN and a power source output terminal VOUT, and includes two first switches S1, two second switches S2 and a capacitor C1. The two first switches S1 and the two second switches S2 are transistors. In this embodiment, the first switches or the second switches S2 are two in number as example, however, the present disclosure is not limited thereto. The switched-capacitor circuit 11 may also include more than two first switches and more than two second switches. The two first switches S1 and the two second switches S2 are respectively coupled to a control terminal, and configured to receive clock signals, which are not overlapped with each other, from the control terminal, so as to be turned on or off. In a first stage of the clock signals, the control terminal turns on the two first switches S1 and turns off the two second switches S2, and at this time, current flows from the supply input terminal VIN to the first switches S1 and the capacitor C1, so as to form a first current path. In a second stage of the clock signals, the control terminal turns on the two second switches S2 and turns off the two first switches S1, and at this time, current flows from ground terminal to the power output terminal VOUT through the second switches S2 and the capacitor C1, so as to form a second current path.

The base bias control circuit 12 is coupled to one of the first switches S1, that is, the base bias control circuit 12 is coupled to base of a transistor served as the first switch S1. The base bias control circuit 12 can apply different base bias to change a threshold voltage of the transistor, thereby increasing conductive resistance of the first switch S1 to decrease ripple occurred at the power output terminal VOUT. The base bias control circuit 12 is coupled to the power output terminal VOUT to receive a voltage at the power output terminal VOUT, and compare the voltage at the power output terminal VOUT ad a preset reference voltage. When the voltage at the power output terminal VOUT is higher than the reference voltage, and base bias control circuit 12 outputs a first voltage to the base of the transistor. When the voltage at the power output terminal VOUT is not higher than the reference voltage, the base bias control circuit 12 outputs a second voltage to the base of the transistor. The first voltage is higher than the second voltage. The following describes embodiment for detailed illustration of circuit configuration of the base bias control circuit 12.

Figure 2:
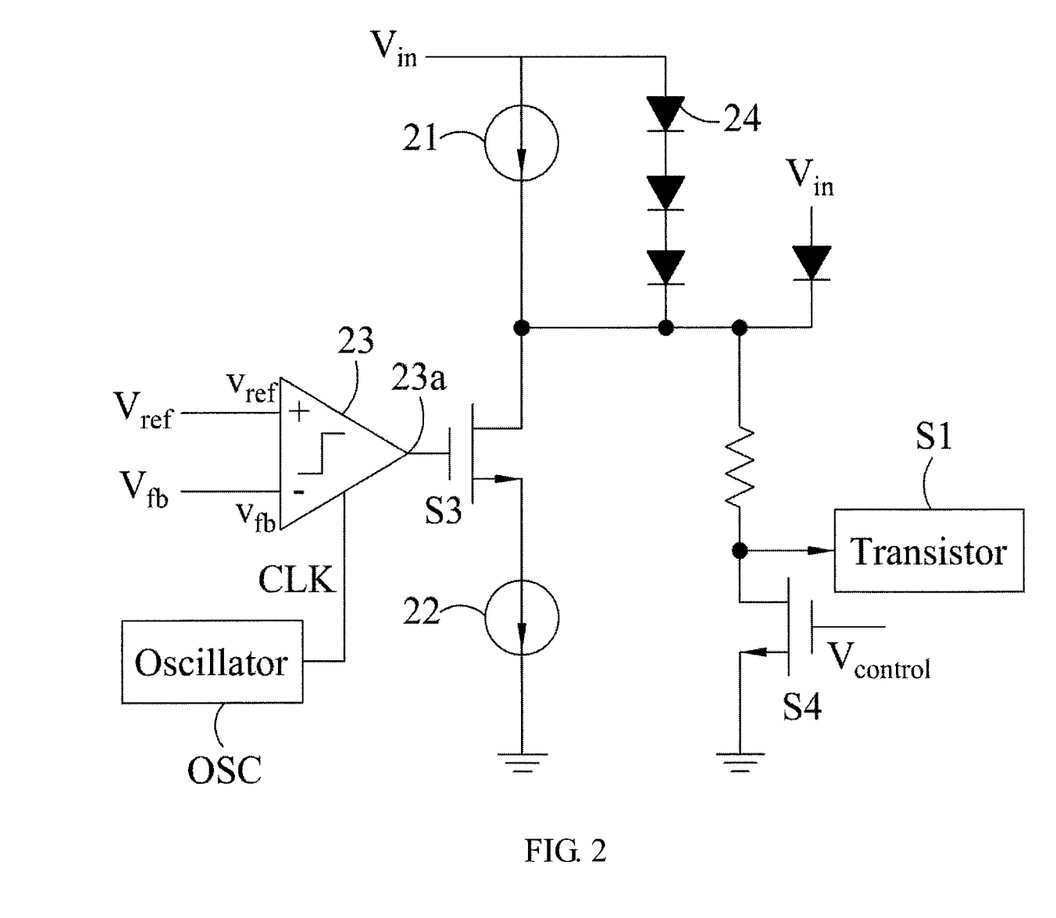
FIG. 2 is a schematic view of a base bias control circuit of the present disclosure.

The following refers to FIG. 2, which is a schematic view of the base bias control circuit of the present disclosure. As shown in FIG. 2, the base bias control circuit 12 includes a first current source 21, a second current source 22, a comparator 23 and a third switch S3. The first current source 21 includes a first current output terminal which has a voltage Vin in default, and a first current input terminal. The first current output terminal is coupled to the base of the transistor served as the first switch S1. The comparator 23 includes a first input terminal Vfb, a second input terminal Vref and a signal output terminal 23a. The first input terminal Vfb is coupled to the power output terminal to receive a voltage vfb at the power output terminal. A reference voltage vref is inputted to the second input terminal Vref. The comparator 23 compares the voltage vfb and the reference voltage vref, and then generates a control signal according to a comparison result. The control signal is outputted at a signal output terminal 23a. The comparator 23 is coupled to an oscillator OSC to receive a clock signal CLK generated by the oscillator OSC. The comparator 23 is operated based on the received clock signal CLK to compare the voltage vfb and the reference voltage vref. The third switch S3 includes a first terminal coupled to the first current output terminal of the first current source 21, a second terminal coupled to the second current input terminal of the second current source 22, and a control terminal coupled to the signal output terminal 23a of the comparator 23. The third switch S3 can be turned on or off by the control signal outputted from the comparator 23.

According to aforementioned circuit configuration, when the voltage vfb is higher than the reference voltage vref, the third switch S3 is turned off by the control signal generated by the comparator 23, and at this time, the first current source 21 is coupled to the transistor of the first switch S1 only, so the current flows from the first current source 21 to the base of the transistor, and the base of the transistor of the first switch S1 receives the first voltage, When the voltage at the base of the transistor increases, the conductive resistance of the transistor increases, so as to reduce the ripple of the output voltage occurred at the power output terminal. When the voltage vfb is not higher than the reference voltage vref, the third switch S3 is turned on by the control signal generated from the comparator, so that the current flows from the first current source 21 to the third switch S3. Furthermore, the base bias control circuit 12 may include a plurality of diodes 24 connected in series and between the first current input terminal of the first current source 21 and the base of the transistor of the first switch S1. As a result, the voltage at the base of the transistor is clamped by the plurality of diodes 24 to be a second voltage lower than the first voltage. The voltage at the base of the transistor decreases, so the capacitor C1 is charged more through the supply input terminal VIN.

Furthermore, the base bias control circuit 12 can include a fourth switch S4 which has an end coupled to the base of the transistor of the first switch S1, other end being grounded, and a control terminal Vcontrol configured to receive an external control signal. When the user wants to operate the switched-capacitor DC-DC power converter circuit for heavy load, the use can directly input the external control signal with high voltage level to the control terminal Vcontrol to turn on the fourth switch S4, so as to connect the base of the first switch S1 to ground. In this condition, operation of the switched-capacitor circuit is focused on lower on-resistance for reducing conduction loss, but not on reduction of the ripple of the output voltage occurred at the power output terminal.

Figure 3:
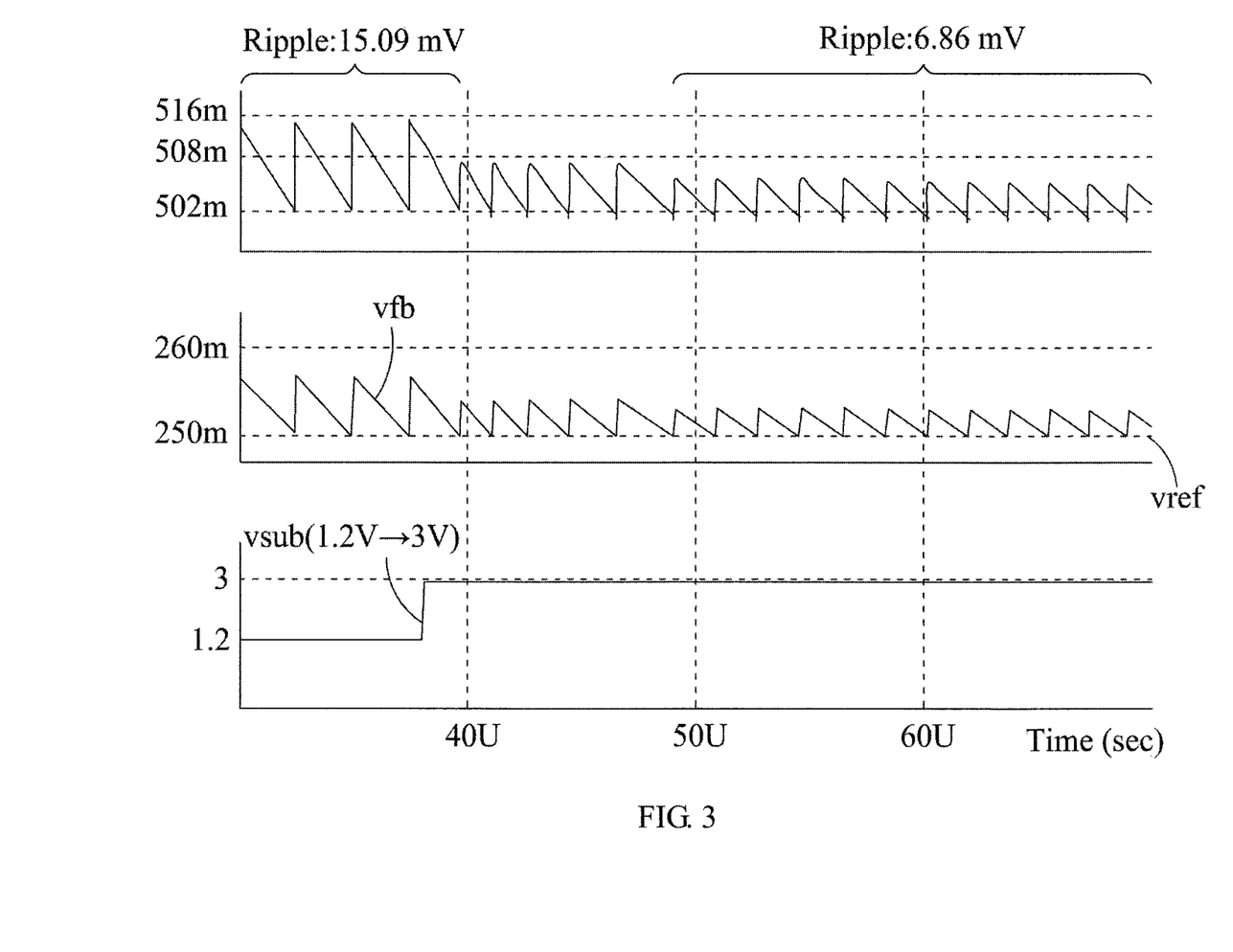
FIG. 3 is a schematic view of voltage waveform at output terminal of the switched-capacitor DC-DC power converter circuit of the present disclosure.

The following refers to FIG. 3, which is a schematic view of waveform of voltage at the output terminal of the present disclosure. As shown in FIGS. 1 and 2, in a original state, the voltage vsub applied on the base of the transistor and the ripple of the output voltage vout at the power output terminal Vout is 15.09 mV. After the voltage applied on the base of the first switch S1 is increased from 1.2V to 3V, the ripple of the output voltage vout at the power output terminal Vout can be reduced to 6.86 mV, that is, 50% of the ripple is eliminated. As a result, control in the base bias for the transistor can reduce the ripple of the output voltage effectively.

Figure 4:
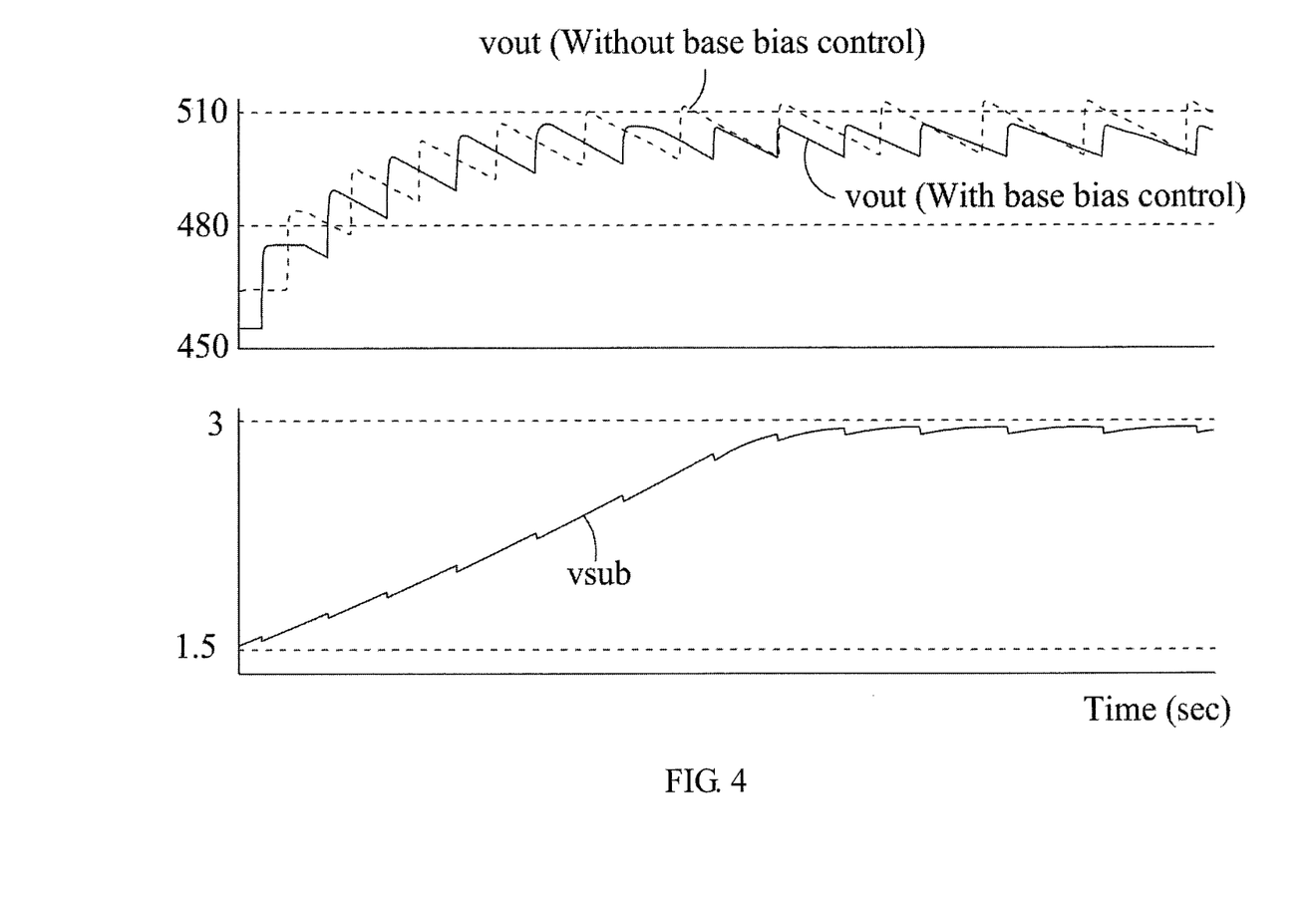
FIG. 4 is a schematic view of waveform after the base bias control is applied, in accordance with the present disclosure.

The following refers to FIG. 4, which is a schematic view of waveform after the base bias is applied. After the voltage vfb at the power output terminal Vout is higher than the reference voltage vref, the base bias control circuit 12 applies voltage to the base of the first switch S1 of the switched-capacitor circuit 11, As shown in FIG. 4, when the applied voltage vsub rises to a stable status (about 3V), the ripple of the output voltage vout (drawn by solid line) under base bias control is lower than the output voltage vout (drawn by dashed line) without base bias control. By using base bias control, the transistor of the switch may have a higher threshold voltage, and the capacitor is charged less, thereby achieving the technical effect of reducing ripple effectively.

Figure 5:
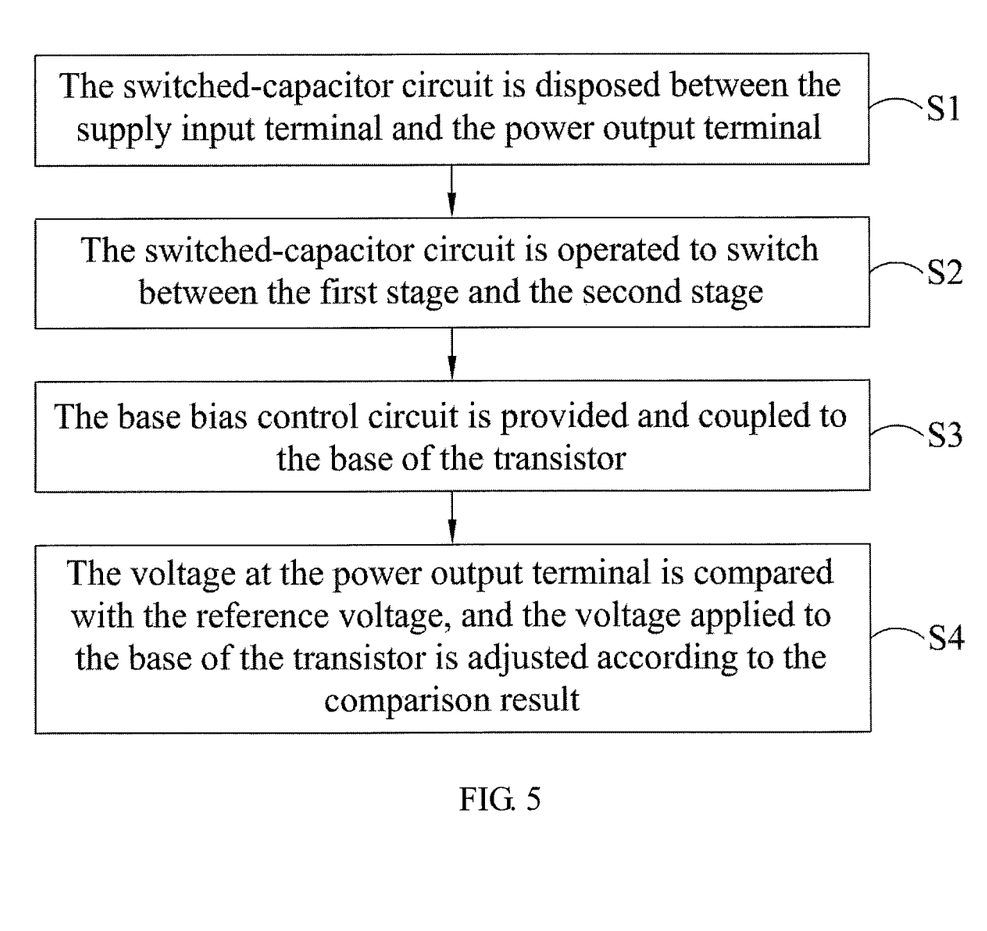
FIG. 5 is a flowchart showing the steps in an operation of a voltage output method using the switched-capacitor DC-DC power converter circuit of the present disclosure.

The following refers to FIG. 5, which is a flowchart showing the steps in an operation of a voltage output method using the switched-capacitor DC-DC power converter circuit of the present disclosure. As shown in FIG. 5, the output voltage method includes following steps.

In a step S10, the switched-capacitor circuit is disposed between the supply input terminal and the power output terminal. The switched-capacitor circuit includes a plurality of first switches, a plurality of second switches, and at least one capacitor, as shown in FIG. 1.

In a step S20, the switched-capacitor circuit is operated to switch between the first stage and the second stage. The plurality of first switches and the second switches of the switched-capacitor circuit are respectively coupled to the control terminal, and the control terminal respectively outputs non-overlapping clock signals to the plurality of first switches and the second switches, so as to turn on/off the first switches and the second switches. In a first stage of the clock signals, the control terminal turns on the two first switches and turns off the two second switches, and at this time, current flows from the supply input terminal to the first switches and the capacitor, so as to form a first current path, and the capacitor is charged by the current. In a second stage of the clock signals, the control terminal turns on the two first switches S1 and turns off the two second switches S2, and at this time, current flows to the power output terminal through the capacitor and the second switches, so as to form the second current path. Based on the clock signals, the switched-capacitor circuit is operated to switch between the first stage and the second stage.

In a step S30, the base bias control circuit is provided and coupled to the base of the transistor. The base bias control circuit can apply voltage to the base, thereby changing the threshold voltage of the transistor to make the on-resistance of the transistor higher. As a result, the ripple of the output voltage can be reduced, as shown in waveform diagram of FIG. 3.

In a step S40, the voltage at the power output terminal is compared with the reference voltage, and the voltage applied to the base of the transistor is adjusted according to the comparison result. When the voltage at the power output terminal is higher than the reference voltage, the base bias control circuit outputs the first voltage to the base of the transistor; otherwise, when the voltage at the power output terminal is not higher than the reference voltage, the base bias control circuit outputs the second voltage, which is lower than the first voltage, to the base of the transistor.

Figure 6:
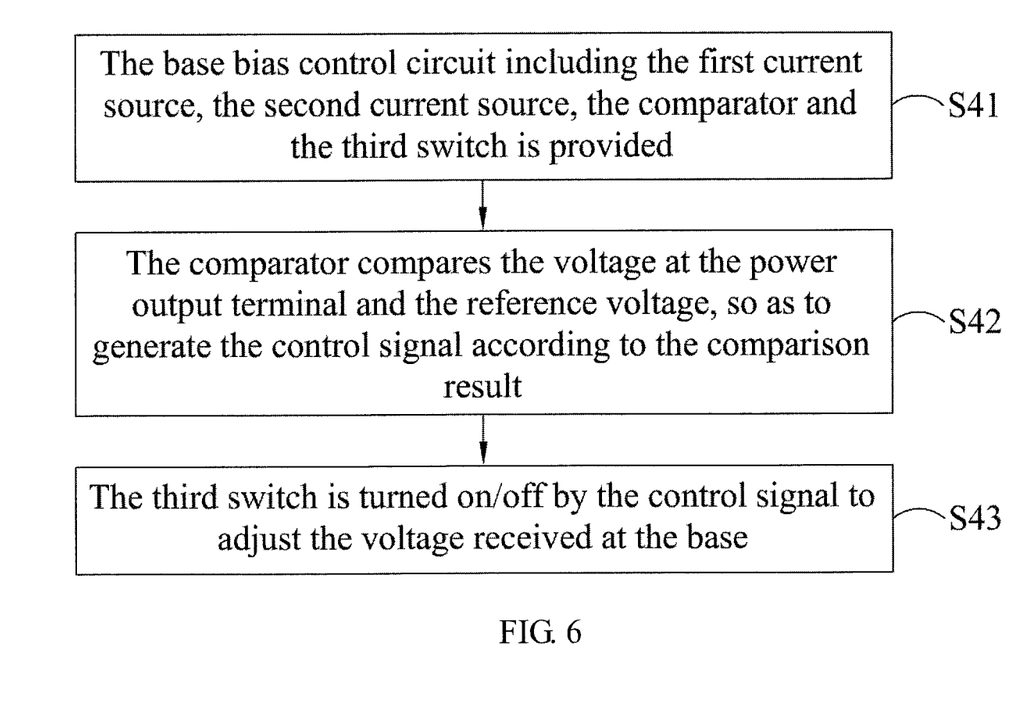
FIG. 6 is a flowchart showing the steps in an operation of a base bias control method of the present disclosure.

The following refers to FIG. 6, which is a flowchart showing the steps in an operation of a base bias control method of the present disclosure. The base bias control method includes following steps.

In a step S41, the base bias control circuit including the first current source, the second current source, the comparator and the third switch is provided. The third switch of the base bias control circuit includes a first terminal coupled to the first current output terminal of the first current source, a second terminal coupled to the second current input terminal of the second current source, and the control terminal coupled to the signal output terminal of the comparator, as shown in FIG. 2. The first current output terminal of the first current source is coupled to the base of the transistor, so when the third switch is turned on, a magnitude of the current flowing into the base is affected. The third switch is turned on/off by the control signal outputted from the comparator.

In a step S42, the comparator compares the voltage at the power output terminal and the reference voltage, so as to generate the control signal according to the comparison result. The comparator of the base bias control circuit includes the first input terminal coupled to the power output terminal and receiving the output voltage fed back from the power output terminal, and the second input terminal receiving the preset reference voltage as a comparison reference. The comparator can receive the clock signal generated by the oscillator, and based on a cycle of the clock signal the comparator compares the voltage at the power output terminal and the reference voltage, so as to generate the control signal according to the comparison result.

In a step S43, the third switch is turned on/off by the control signal to adjust the voltage received at the base. When the output voltage received at the first input terminal is higher than the reference voltage, the comparator generates and transmit the control signal to the control terminal of the third switch to turn off the third switch; at this time, the current flows from the first current source to the base of the transistor, so that the voltage on the base of the transistor is changed, the on-resistance of the transistor increases, and the ripple of the output voltage is reduced. When the output voltage is not higher than the reference voltage, the comparator generates and transmits the control signal to the control terminal of the third switch to turn on third switch, so that the current flows from the first current source to the third switch, and the current flowing to the base of the transistor is reduced. In order to prevent the voltage applied the base of the transistor from being down to zero, the plurality of diodes can be disposed between the current input terminal of the first current source and the base of the transistor, to clamp the applied voltage. As a result, the base of the transistor can still receive a lower voltage for base bias control.

Furthermore, in the step S41, the fourth switch can further be provided. The fourth switch has the terminal coupled to the base of the transistor, other terminal coupled to ground, and the control terminal configured to receive the external control signal. When the user wants to operate the switched-capacitor DC-DC power converter circuit for heavy load, the use can directly input the external control signal with high voltage level to the control terminal to turn on the fourth switch, so as to connect the base of the first switch to ground. In this condition, operation of the switched-capacitor circuit is focused on lower on-resistance for reducing conduction loss, but not on reduction of the ripple of the output voltage occurred at the power output terminal.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. A switched-capacitor DC-DC power converter circuit, comprising:

a switched-capacitor circuit disposed between a power input terminal and a power output terminal, and comprising a plurality of first switches, a plurality of second switches and at least one capacitor, wherein in a first stage of the switched-capacitor circuit, the plurality of first switches are turned on and the plurality of second switches are turned off, and a first current path is formed between the power input terminal and the power output terminal through the plurality of first switches and the at least one capacitor, and in a second stage of the switched-capacitor circuit, the plurality of second switches are turned on and the plurality of first switches are turned off, and a second current path connected with the power output terminal is formed by the plurality of second switches and the at least one capacitor, and each of the plurality of first switches and second switches comprises a transistor; and a base bias control circuit coupled to at least one base of the transistors of the plurality of first switches and the plurality of second switches, and configured to receive an output voltage at the power output terminal and compare the output voltage with a reference voltage, wherein when the output voltage is higher than the reference voltage, the base bias control circuit outputs a first voltage to the at least one base of the transistors, and when the output voltage is not higher than the reference voltage, the base bias control circuit outputs a second voltage, which is lower than the second voltage, to the at least one base of the transistors.

2. The switched-capacitor DC-DC power converter circuit according to claim 1, wherein the base bias control circuit comprises:
a first current source comprising a first current output terminal and a first current input terminal, and the first current output terminal coupled to the at least one base of the transistors, wherein a preset voltage is applied on the first current input terminal;
a second current source comprising a second current input terminal;
a comparator comprising a first input terminal coupled to the power output terminal and configured to receive an output voltage at the power output terminal, a second output terminal configured to receive the reference voltage, and a signal output terminal, wherein the comparator compares the output voltage and the reference voltage, and then output a control signal according to a comparison result; and
a third switch comprising a first terminal coupled to the first current input terminal of the first current source, a second terminal coupled to the second current input terminal of the second current source, and a control terminal coupled to the signal output terminal of the comparator;
wherein when the output voltage is higher than the reference voltage, the third switch is turned off by the control signal, so that the at least one base of the transistors receives the first voltage, and when the output voltage is not high than the reference voltage, the third switch is turned on by the control signal, so that the at least one base of the transistors receives the second voltage.

3. The switched-capacitor DC-DC power converter circuit according to claim 2, wherein the base bias control circuit comprises a fourth switch which comprises a terminal coupled to the at least one base of the transistors, other terminal coupled to ground, and a control terminal receiving an external control signal.

4. The switched-capacitor DC-DC power converter circuit according to claim 2, further comprising a plurality of diodes connected in series and disposed between the first current input terminal of the first current source and the at least one base of the transistors.

5. The switched-capacitor DC-DC power converter circuit according to claim 2, wherein the comparator is coupled to an oscillator and the comparator receives a clock signal generated by the oscillator, and the comparator is operated based on the clock signal to compare the output voltage with the reference voltage.

6. A voltage output method using a switched capacitor DC-DC power converter circuit, comprising:
providing a switched-capacitor circuit, which comprises a plurality of first switches, a plurality of second switches and at least one capacitor, disposed between a power input terminal and a power output terminal;
operating the switched-capacitor circuit to switch between a first stage and a second stage, and in the first stage turning on the plurality of first switches and turning off the plurality of second switches, so as to form a first current path between the power input terminal and the power output terminal through the plurality of first switches and the at least one capacitor, and in the second stage, turning on the plurality of second switches and turning off the plurality of first switches, so as to form a second current path coupled to the power output terminal through the plurality of second switches and the at least one capacitor;
providing a base bias control circuit coupled to at least one base of transistors of the plurality of first switches and the plurality of second switches, wherein the base bias control circuit receives an output voltage at the power output terminal; and
comparing the output voltage with a reference voltage, wherein when the output voltage is higher than the reference voltage, the base bias control circuit outputs a first voltage to the at least one base of the transistors, and when the output voltage is not higher than the reference voltage, the base bias control circuit outputs a second voltage, which is lower than the first voltage, to the at least one base of the transistors.

7. The voltage output method according to claim 6, wherein the base bias control circuit comprises:
a first current source comprising a first current output terminal and a first current input terminal, and the first current output terminal coupled to the at least one base of the transistors, wherein a preset voltage is applied on the first current input terminal;
a second current source comprising a second current input terminal;
a comparator comprising a first input terminal coupled to the power output terminal and configured to receive an output voltage at the power output terminal, a second output terminal configured to receive the reference voltage, and a signal output terminal, wherein the comparator compares the output voltage and the reference voltage, and then output a control signal according to a comparison result; and
a third switch comprising a first terminal coupled to the first current input terminal of the first current source, a second terminal coupled to the second current input terminal of the second current source, and a control terminal coupled to the signal output tell final of the comparator;
wherein when the output voltage is higher than the reference voltage, the third switch is turned off by the control signal, so that the at least one base of the transistors receives the first voltage, and when the output voltage is not high than the reference voltage, the third switch is turned on by the control signal, so that the at least one base of the transistors receives the second voltage.

8. The voltage output method according to claim 6, further comprising:
disposing a fourth switch which comprises a terminal coupled to the at least one base of the transistors, other terminal coupled to ground, and a control terminal receiving an external control signal.

9. The voltage output method according to claim 7, further comprising:
providing a plurality of diodes connected in series to clamp a preset voltage applied on the first current input terminal of the first current source under a condition that the output voltage is not higher than the reference voltage and the third switch is turned on.

10. The voltage output method according to claim 7, wherein the comparator is coupled to an oscillator, and the comparator receives a clock signal generated by the oscillator, and the comparator is operated based on the clock signal to compare the output voltage with the reference voltage.

* * * * *